United States Patent
Puzis et al.

(10) Patent No.: US 10,866,998 B2
(45) Date of Patent: Dec. 15, 2020

(54) SYSTEM AND METHOD FOR IDENTIFYING CONTACTS OF A TARGET USER IN A SOCIAL NETWORK

(71) Applicant: Verint Systems Ltd., Herzliya Pituach (IL)

(72) Inventors: Rami Puzis, Ashdod (IL); Roni Stern, Modi'in (IL); Lior Rokach, Omer (IL); Yuval Elovici, Arugot (IL); Tal Beja, Ashdod (IL); Ariel Felner, Yad Binyamin (IL); Zahy Bnaya, Tel Aviv (IL); Liron Samama, Beer Sheva (IL)

(73) Assignee: VERINT SYSTEMS LTD., Pituach (IL)

( * ) Notice: Subject to any disclaimer, the term of this patent is extended or adjusted under 35 U.S.C. 154(b) by 952 days.

(21) Appl. No.: 15/454,357

(22) Filed: Mar. 9, 2017

(65) Prior Publication Data
US 2017/0300580 A1    Oct. 19, 2017

Related U.S. Application Data

(63) Continuation of application No. 14/065,505, filed on Oct. 29, 2013, now Pat. No. 9,646,245.

(30) Foreign Application Priority Data

Oct. 29, 2012    (IL) .......................................... 222743

(51) Int. Cl.
*G06F 16/9535*    (2019.01)
*G06N 5/00*    (2006.01)
(Continued)

(52) U.S. Cl.
CPC ...... *G06F 16/9535* (2019.01); *G06F 16/2379* (2019.01); *G06F 16/24575* (2019.01);
(Continued)

(58) Field of Classification Search
CPC ............. G06F 16/9535; G06F 16/2379; G06F 16/24575; G06N 20/00; G06N 5/003; G06Q 50/01; H04L 67/306
See application file for complete search history.

(56) References Cited

U.S. PATENT DOCUMENTS 5,689,442 A    11/1997    Swanson et al.
6,404,857 B1    6/2002    Blair et al.
(Continued)

OTHER PUBLICATIONS

Cutillo et al., Privacy Preserving Social Networking Through Decentralization, IEEE, 2009, Total pages 8 (Year: 2009).*
(Continued)

*Primary Examiner* — Alan Chen
(74) *Attorney, Agent, or Firm* — Meunier Carlin & Curfman LLC

(57) ABSTRACT

When using Web intelligence ("Webint") to collect information regarding a target social network user, one of the most valuable pieces of information is the target user's List-Of-Friends (LOF). In some cases, however, the LOF of the target user is not accessible in his profile. Herein are described methods and systems for identifying the LOF of a target user. An analysis system crawls the profiles of social network users, other than the target user, and reconstructs the LOF of the target user from the crawled profiles.

20 Claims, 2 Drawing Sheets

(51) Int. Cl.

| | |
|---|---|
| G06N 20/00 | (2019.01) |
| G06F 16/23 | (2019.01) |
| G06F 16/2457 | (2019.01) |
| H04L 29/08 | (2006.01) |
| G06Q 50/00 | (2012.01) |

(52) U.S. Cl.
    CPC ............ *G06N 5/003* (2013.01); *G06N 20/00* (2019.01); *G06Q 50/01* (2013.01); *H04L 67/306* (2013.01)

(56) References Cited

U.S. PATENT DOCUMENTS

| | | | |
|---|---|---|---|
| 6,718,023 | B1 | 4/2004 | Zolotov |
| 6,741,992 | B1 | 5/2004 | McFadden |
| 6,757,361 | B2 | 6/2004 | Blair et al. |
| 7,216,162 | B2 | 5/2007 | Amit et al. |
| 7,466,816 | B2 | 12/2008 | Blair |
| RE40,634 | E | 2/2009 | Blair et al. |
| 7,587,041 | B2 | 9/2009 | Blair |
| 8,005,897 | B1 | 8/2011 | Roka et al. |
| 9,225,829 | B2 | 12/2015 | Agúndez Dominguez et al. |
| 2008/0014873 | A1 | 1/2008 | Krayer et al. |
| 2008/0069437 | A1 | 3/2008 | Baker |
| 2008/0222127 | A1 | 9/2008 | Bergin |
| 2008/0261192 | A1 | 10/2008 | Huang et al. |
| 2008/0285464 | A1 | 11/2008 | Katzir |
| 2009/0271370 | A1 | 10/2009 | Jagadish et al. |
| 2010/0306185 | A1 | 12/2010 | Smith et al. |
| 2012/0110677 | A1 | 5/2012 | Abendroth et al. |
| 2013/0046824 | A1* | 2/2013 | Park ...................... G06Q 10/10 709/204 |
| 2013/0144915 | A1 | 6/2013 | Ravi et al. |
| 2013/0151616 | A1 | 6/2013 | Amsterdamski |
| 2013/0166574 | A1* | 6/2013 | Kang ...................... G06F 16/16 707/749 |
| 2014/0096261 | A1 | 4/2014 | Boldyrev et al. |
| 2014/0207917 | A1 | 7/2014 | Tock et al. |

OTHER PUBLICATIONS

Bonneau et al., Eight Friends Are Enough: Social Graph Approximation via Public Listings, SNS '09 Nuremberg, Germany, ACM, 2009 (Year: 2009).*

Bonneau et al., Prying Data out of a Social Network, 2009 Advances in Social Network Analysis and Mining, pp. 250-254 (Year: 2009).*

European Search Report and Preliminary Opinion, dated Jan. 14, 2014, received in connection with corresponding European Application No. 13190708.

Aho, Alfred V., et al., "Efficient String Matching: An Aid to Bibliographic Search," Communication of the ACM, Jun. 1975, vol. 18, No. 6, pp. 333-340.

Altshuler, Y., et al., "How Many Makes a Crowd? On the Evolution of Learning as a Factor of Community Coverage," LNCS 7227, 2012, pp. 43-52.

Altshuler, Y., et al., "Incremental Learning with Accuracy Prediction of Social and Individual Properties from Mobile-Phone Data," IEEE, 2011, 10 pages.

Altshuler, Y., et al., "Trade-Offs in Social and Behavioral Modeling in Mobile Networks," LNCS 7812, 2013, pp. 412-423.

Chawla, N., et al., "SMOTE: Synthetic Minority Over-sampling Technique," Journal of Artificial Intelligence Research, vol. 16, 2002, pp. 321-357.

Cloudshield, Inc., "Lawful Intercept Next-Generation Platform," 2009, 6 pages.

Coffman, T., et al., "Graph-Based Technologies for Intelligence Analysis," CACM, Mar. 2004, 12 pages.

Corney, M., et al. "Gender-Preferential Text Mining of E-mail Discourse," Proceedings of the 18the Annual Computer Security Applications Conference, 2002, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Eagle, N., et al., "Inferring friendship network structure by using mobile phone data," PNAS, vol. 106, No. 36, 2009, pp. 15274-15278.

Fisk, Mike, et al., "Applying Fast String Matching to Intrusion Detection," LOS Alamos National Laboratory and University of California San Diego, Jun. 1975, 22 pages.

FoxReplay Analyst, Fox Replay BV, http//www.foxreplay.com, Revision 1.0, Nov. 2007, 5 pages.

FoxReplay Analyst Product Brochure, Fox-IT BV, http//www.foxreplay.com, 2006, 2 pages.

Goldfarb, Eithan, "Mass Link Analysis: Conceptual Analysis," Jun. 24, 2007, Version 1.1, 21 pages.

Liu, R-T., et al., "A Fast Pattern-Match Engine for Network Processor-based NIDS," Proceedings of the $20^{th}$ International Conference on Information Technology (ITCC'04), 2006, 23 pages.

Netronome SSL Inspector Solution Overview White Paper, "Examining SSL-encrypted Communications," 2010, 8 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Rohde & Schwarz GmbH & Co. KG, "ACCESSNET-T, DMX-500 R2, Digital Mobile eXchange," Product Brochure, Secure Communications, Mar. 2000, 4 pages.

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "Integrated Digital Audio Software R&S AllAudio," Specifications, 2000, 8 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Schulzrinne, H., et al., "RTP: A Transport Protocol for Real-Time Applications," Standards Track, Jul. 2003, 89 pages.

Sheng, Lei, et al., "A Graph Query Language and Its Query Processing," IEEE, Apr. 1999, pp. 572-581.

Soghoian, Christopher, et al., "Certified Lies: Detecting and Defeating Government Interception Attacks Against Ssl," 2010, 19 pages.

Svenson, Pontus, et al., "Social network analysis and information fusion for anti-terrorism," CIMI, 2006, 8 pages.

Tongaonkar, Alok S., "Fast Pattern-Matching Techniques for Packet Filtering," Stony Brook University, May 2004, 44 pages.

Verint Systems Inc., "Mass Link Analysis: Conceptual Analysis," Jun. 2007, 21 pages.

Verint Systems Inc., "Mass Link Analysis: Solution Description," Dec. 2008, 16 pages.

(56) References Cited

OTHER PUBLICATIONS

Yu, Fang, et al., "Fast and Memory-Efficient Regular Expression Matching for Deep Packet Inspection," ANCS'06, San Jose, California, Dec. 3-5, 2006, 10 pages.

Yu, Fang, et al., "Gigabit Rate Packet Pattern-Matching Using TCAM," Proceedings of the 12th IEEE International Conference on Network Protocols (ICNP'04), 2004, 10 pages.

\* cited by examiner

US 10,866,998 B2

SYSTEM AND METHOD FOR IDENTIFYING CONTACTS OF A TARGET USER IN A SOCIAL NETWORK

CROSS-REFERENCE TO RELATED APPLICATIONS

This application is a continuation of U.S. patent application Ser. No. 14/065,505, filed on Oct. 29, 2013, and claims foreign priority to Israel Patent Application No. IL 222743 filed on Oct. 29, 2012. These applications are hereby incorporated by reference in their entirety.

FIELD OF THE DISCLOSURE

The present disclosure relates generally to Web intelligence, and particularly to methods and systems for analyzing social network activity.

BACKGROUND OF THE DISCLOSURE

In recent years, social networks such as Facebook™, Twitter™, LinkedIn™, YouTube™ and others have become a popular scene for interaction between network users. These social networks accumulate large amounts of information regarding the users and the interactions between them. As such, social networks can be used for obtaining valuable information regarding target users.

SUMMARY OF THE DISCLOSURE

An embodiment that is described herein provides a method including receiving a request to identify a group of users of one or more social networks, who are defined as contacts of a target user of the social networks. One or more profiles of respective users of the social networks, other than the target user, are analyzed responsively to the request, and the contacts of the target user are reconstructed from the analyzed profiles.

In an embodiment, a list of the contacts of the target user is inaccessible in a profile of the target user. In a disclosed embodiment, analyzing the profiles includes initially receiving a subset of the contacts of the target user, and expanding the subset by iteratively crawling the profiles of the contacts in the subset. Typically, analyzing the profiles includes selecting a potential contact of the target user from among currently-known profiles, and, upon identifying that the potential contact is connected to the target user, adding the potential contact to the reconstructed group.

In some embodiments the method includes, upon identifying that the potential contact is connected to the target user, retrieving the contacts of the potential contact and adding the profiles of the contacts of the potential contact to the currently-known profiles. The method may include iteratively selecting the potential contact, identifying whether the potential contact is connected to the target user and updating the currently-known profiles, until meeting a termination condition.

In an example embodiment, selecting the potential contact includes choosing the potential contact from among the currently-known profiles at random. In another embodiment, selecting the potential contact includes choosing an oldest profile among the currently-known profiles that is not previously selected.

In yet another embodiment, selecting the potential contact includes choosing a profile having a maximum similarity in attribute values to the profile of the target user among the currently-known profiles. In still another embodiment, selecting the potential contact includes choosing a profile that is connected to a contact of the target user that is connected to a largest number of the contacts of the target user.

In an embodiment, selecting the potential contact includes defining first and second heuristics for selection of the potential contact, training a classifier to optimally combine the first and second heuristics using training data, and choosing the potential contact based on the optimally-combined heuristics. Training the classifier may include testing a default heuristic over a given number of initial potential contacts of the target user to produce training results, and combining the first and second heuristics based on the training results. Alternatively, training the classifier may include combining the first and second heuristics based on one or more previous searches for LOFs of other target users.

In some embodiments, selecting the potential contact includes defining for each of the currently-known profiles a respective score that is indicative of a likelihood of the currently-known profile to be connected to a contact of the target user that is connected to other contacts of the target user, and choosing the potential contact based on respective scores of the currently-known profiles.

There is additionally provided, in accordance with an embodiment that is described herein, apparatus including an interface and a processor. The interface is configured to communicate with one or more social networks. The processor is configured to receive a request to identify a group of users of the social networks who are defined as contacts of a target user of the social networks, to analyze, responsively to the request, one or more profiles of respective users of the social networks other than the target user, and to reconstruct the contacts of the target user from the analyzed profiles.

The present disclosure will be more fully understood from the following detailed description of the embodiments thereof, taken together with the drawings in which:

DETAILED DESCRIPTION OF EMBODIMENTS

Overview

Figure 1:
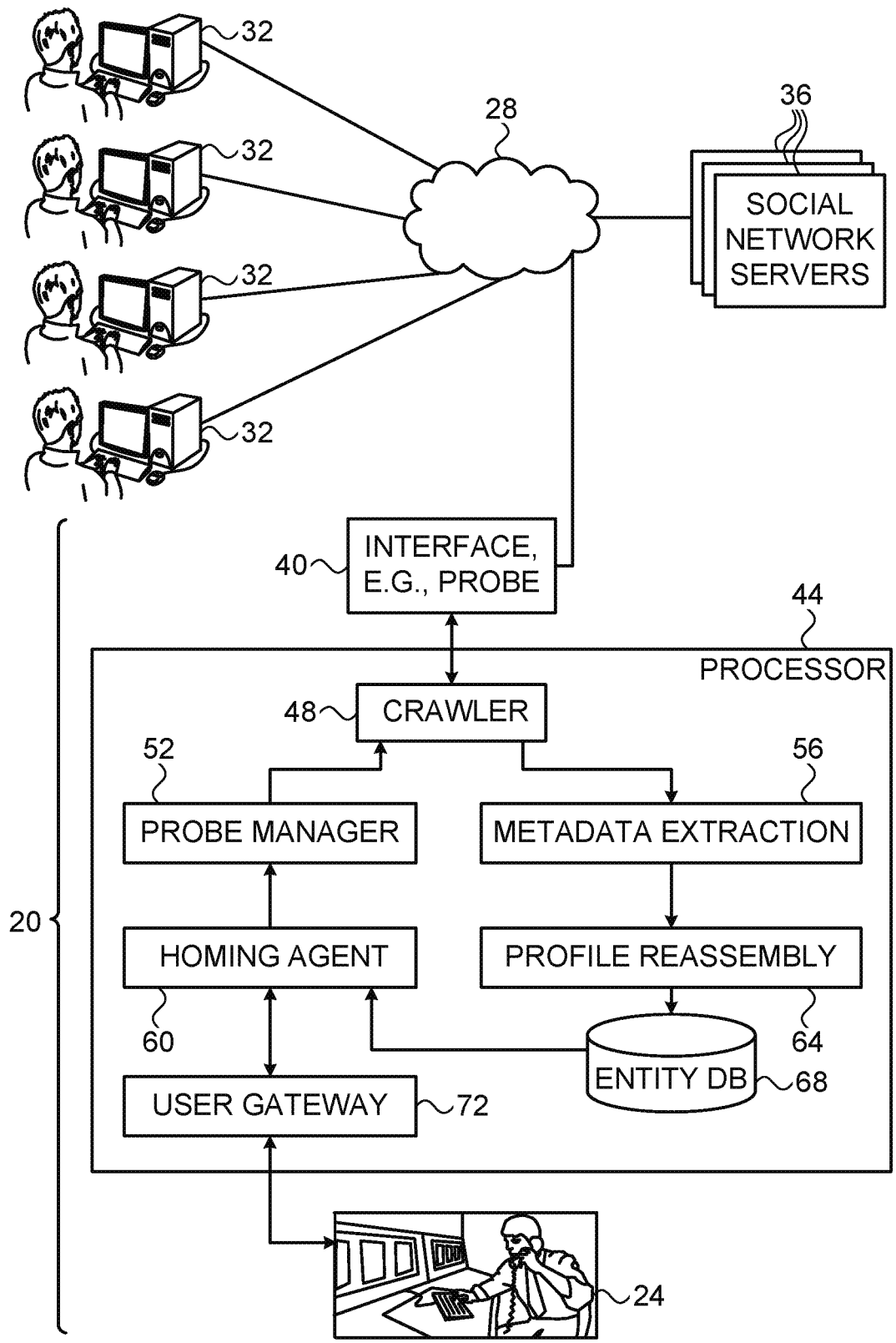
FIG. 1 is a block diagram that schematically illustrates a system for social network analysis, in accordance with an embodiment that is described herein.

When using Web intelligence ("Webint") to collect information regarding a target social network user, one of the most valuable pieces of information is the target user's List-Of-Friends (LOF). The LOF lists the social network users who are defined as contacts of the target user, and is typically stored as part of the target user's profile. In various networks the contacts are also referred to as friends, links, connections, followers, or similar terms.

In some cases, however, the LOF of the target user is not accessible in his profile, e.g., because of the privacy policy defined for the profile. This scenario is particularly common for users who try to hide the identities of their contacts. Certain aspects of profiling target users based on social network analysis are also addressed in Israel Patent Application 216059, filed Oct. 31, 2011, which is assigned to the assignee of the present patent application and whose disclosure is incorporated herein by reference.

Embodiments that are described herein provide improved methods and systems for identifying the LOF of a target user. In the disclosed embodiments, an analysis system crawls the profiles of social network users, other than the target user, and reconstructs the LOF of the target user from the crawled profiles. This technique is effective since the LOFs of the target user's contacts may not be hidden.

Several example techniques for analyzing the contact environment of the target user are described herein. In a typical flow, the system is provided with an initial subset of the target user's contacts, referred to as initial leads. (The terms "leads" and "contacts of the target user" are used interchangeably herein.) The system acquires the LOFs of the initial leads, and defines the users listed in these LOFs as "potential leads," i.e., potential contacts of the target user. The system then attempts to identify which of the potential leads are indeed contacts of the target user ("leads"). The newly-identified leads are added to the initial leads, and the process continues iteratively in a similar manner.

When searching for new leads in order to reconstruct the LOF of the target user, it is important to define how to select potential leads for evaluation from the increasingly-growing number of new potential leads. The order in which potential leads are evaluated has a considerable impact on the search performance, i.e., on the ability to identify a maximum number of genuine leads within allocated time and/or resources.

In particular, the disclosed techniques are highly effective in reconstructing the LOF of a target user while crawling and accessing only a small number of user profiles. As such, these techniques are useful in minimizing the exposure to throttling and anti-scraping schemes that may be used by the social networks. In addition, the disclosed techniques are useful in reducing the computational resources needed for the search.

Several example techniques and heuristics for prioritizing the potential leads are described herein. Some disclosed techniques apply a "best first search" approach, in which the potential lead that best matches some quality criterion is selected next for evaluation. Several such criteria and heuristics are defined and demonstrated.

In summary, the methods and systems described herein reconstruct the LOF of a target user, even though the LOF is not accessible in the target user's profile. The example search processes and heuristics described herein achieve high efficiency in reconstructing the target user LOF with limited resources and limited exposure. The disclosed techniques thus improve the quality of information collected by Web intelligence applications.

System Description

FIG. 1 is a block diagram that schematically illustrates a system 20 for social network analysis, in accordance with an embodiment that is described herein. System 20 interacts with one or more social networks and reconstructs the Lists-Of-Friends (LOFs) of target users. The reconstructed LOFs are presented to an operator 24.

Systems of this sort may be used, for example, by government and law enforcement agencies for collecting information on suspect individuals such as terrorists or criminals. Another application of such systems is in detecting and preventing fraud in banks and other financial institutions. For example, a financial institution may use a system such as system 20 as part of a "Know Your Customer" (KYC) scheme for collecting background information on customers.

System 20 is connected to a communication network 28, typically the Internet. In particular, system 20 crawls profiles of users 32 of social networks. The profiles are typically stored on servers 36 of the social networks. The social networks in question may comprise, for example, Facebook™, Twitter™, LinkedIn™, Google+™, YouTube™, or any other suitable social network application.

Typically, the social network servers maintain user profiles of the various social network users. For each user, the profile holds various information items. In particular, the profile of each user comprises a List-Of-Friends (LOF), i.e., a list of other users (sometimes nicknamed "friends," "links," "connections" or "followers") who are connected to the user. The profile may also comprise information such as the user's pages, personal information, communication interactions of the user, sent and received contact requests, user preferences, user location, images, affiliation of the user with affiliation groups, updates or modifications performed in the user profile over time, interactions of the user with various social network pages and/or any other suitable information.

In the example configuration of FIG. 1, system 20 comprises an interface 40 for communicating with the social network, and a processor 44 that carries out the disclosed techniques. Interface 40 may comprise, for example, a network probe. Processor 44 comprises a crawler 48 that crawls the social network. A homing agent 60 defines the information (e.g., user profiles) to be crawled by crawler 48. A probe manager 52 controls crawler 48, e.g., prioritizes the crawling tasks defined by agent 60 for crawler 48.

A metadata extraction unit 56 extracts the desired information from the output of crawler 48, and also carries out tasks such as normalization of information obtained from different social networks to a common data model. A profile reassembly unit 64 reassembles user profiles from partial information gathered by crawler 44.

An entity database 68 stores the reassembled information, e.g., user profiles and LOFs. The information in database 68 is also used for defining crawling tasks by homing agent 60. A user gateway serves as an interface between processor 44 and operator 24.

The configuration of system 20 shown in FIG. 1 is an example system configuration, which is chosen purely for the sake of conceptual clarity. In alternative embodiments, any other suitable system configuration can also be used. In the description that follows, the methods described herein are referred to generally as being performed by processor 44, regardless of the specific processor component that performs each task. The functions of processor 44 may be carried out by any desired number of computing platforms, such as computers, servers or gateways.

The elements of system 20, such as processor 44 and its various components, may be implemented in hardware, in software, or using a combination of hardware and software elements. Database 68 may be implemented using any suitable storage devices, such as solid state or magnetic disks.

In some embodiments, certain functions of processor 44 can be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Reconstructing Hidden LOF of a Target User

Figure 2:
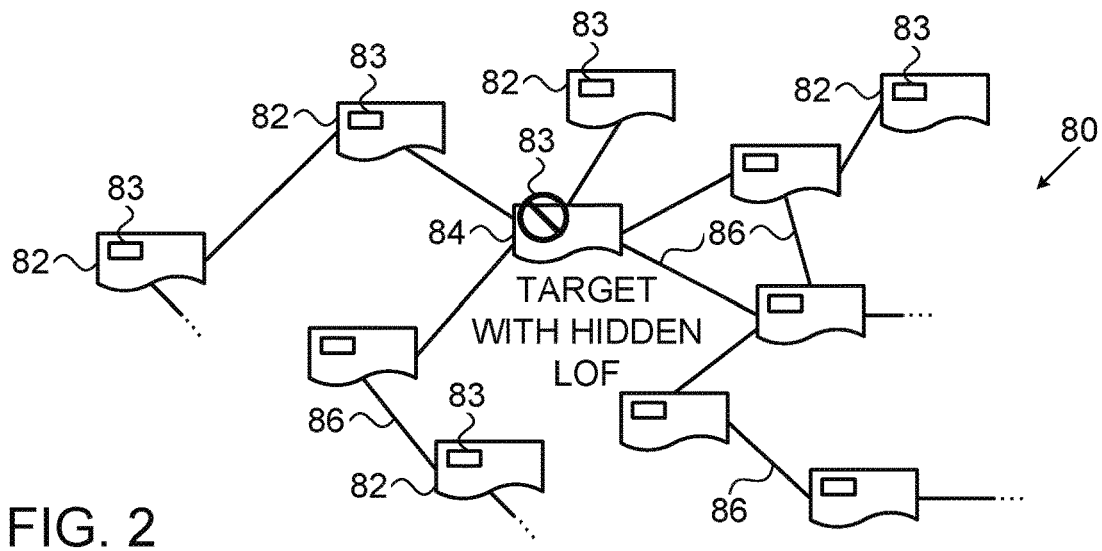
FIG. 2 is a graph that schematically illustrates relationships between profiles of a social network, in accordance with an embodiment that is described herein.

FIG. 2 is a graph that schematically illustrates relationships among user profiles 82 of a social network, in accordance with an embodiment that is described herein. Each profile 82 comprises a respective LOF 83 that lists the contacts of that user. Arcs 86 in the figure represent contact relationships: A pair of profiles is connected by an arc if at least one of them appears in the LOF of the other.

In the present example, a profile 84 of a predefined target user is shown at the center of the figure. Profile 84 is referred to as a target profile. The terms "target user" and "target profile" are sometimes used interchangeably. LOF 83 of the target user is inaccessible to other users (and thus to system 20), for example because the target user set the privacy policy of his profile so as to hide the LOF. In other cases, the target user may not have a profile at all. In many cases, however, it is important for system 20 to reconstruct the LOF of target profile 84, in order to gain valuable information regarding the target user and his contacts.

In some embodiments, processor 44 reconstructs the LOF of the target profile by crawling other profiles 82 of the social network. In the disclosed embodiments, processor 44 carries out an iterative search process that examines the LOFs 83 of various profiles 82 in order to identify contacts ("leads") of the target user.

When crawling the user profiles, processor 44 is able to perform two types of queries, referred to as a focused query and a full acquisition. A focused query is applied to a pair of profiles P1 and P2, and returns "TRUE" if P1 and P2 are connected (i.e., if P1 appears in the LOF of P2 and/or P2 appears in the LOF of P2). Otherwise, the focused query returns "FALSE". A full acquisition is applied to a profile P and returns the complete LOF of P.

In some embodiments, the goal of the search process is to recover and fully acquire all the elements of LOF 83 of target profile 84 (or other predefined number of elements) with a smallest possible number of focused queries and full acquisitions. In other embodiments, the goal may be to recover and fully acquire as many elements of the target user LOF as possible, within a certain permitted number of focused queries and full acquisitions. Further alternatively, the goal may be defined in any other suitable way. The description that follows refers mainly to the latter goal, but the disclosed techniques are generally suitable for other goal definitions, as well.

In the disclosed embodiments, the search is performed under several assumptions. First, focused queries are used only to discover whether a certain profile is connected to the target profile or not. Second, if a focused query reveals that the queried profile is connected to the target profile, the queried profile is fully acquired. Third, only profiles that are known to be leads (i.e., connected to the target profile) are fully acquired.

At any given time during the search, processor 44 maintains the current state of the search. The state defines the part of the social network connectivity graph (e.g., FIG. 2) that was discovered so far. This part is referred to as the Currently-Known Graph (CKG). In addition, the state indicates which profiles in the CKG have been fully acquired and which have not.

In some embodiments, processor 44 carries out the search using "best first search" framework. In an example "best first search" implementation, processor 44 maintains two priority lists or other data structures denoted OPEN and CLOSED. (In some embodiments, although not necessarily, the OPEN list comprises a priority queue, and the CLOSED list comprises a searchable set such as a hash table.) The CLOSED list is initially empty, and the OPEN queue initially comprises a certain initial subset of one or more known leads. First, the initial leads are fully acquired, and the profiles that appear in the LOFs of the initial leads are added to the OPEN queue. The profiles added to the OPEN list are referred to as "potential leads," since it is not yet known whether they are connected to the target profile or not.

In each iteration, a "best" profile is selected from the potential leads in the OPEN queue, according to some selection heuristic. The selected best profile is put in the CLOSED list, where a focused query is applied to it. If the best node is found to be a lead, it is fully acquired, and the newly-generated profiles are added as potential leads to the OPEN queue. The CKG is updated as necessary. The iterative search continues in this manner until some termination condition is met, e.g., until the permitted number of focused queries and full acquisitions is exhausted.

Figure 3:
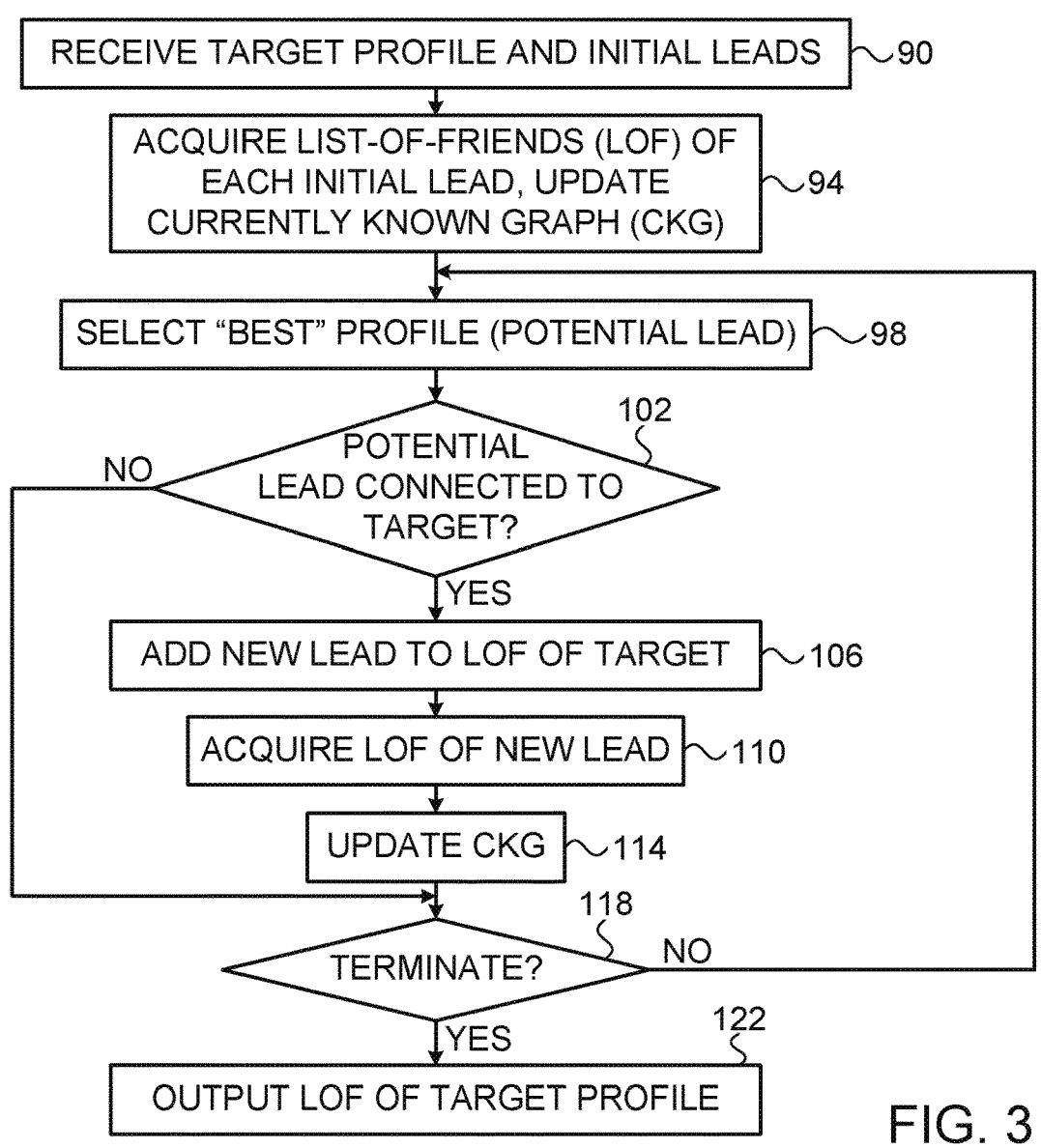
FIG. 3 is a flow chart that schematically illustrates a method for identifying a List-Of-Friends (LOF) of a target social network user, in accordance with an embodiment that is described herein.

FIG. 3 is a flow chart that schematically illustrates a method for identifying a List-Of-Friends (LOF) of a target social network user, in accordance with an embodiment that is described herein. The method begins with processor 44 receiving a request to reconstruct the LOF of a target user, at a request step 90. The assumption is that the LOF of the target user is hidden and inaccessible in the target profile. The request typically comprises the identity of the target user, and one or more initial leads (i.e., one or more known elements of the target user LOF).

At an initial full acquisition step 94, processor 44 performs full acquisition on the initial leads, i.e., obtains the LOFs of the initial leads. At this point, the potential leads in the OPEN queue comprise the profiles that appear in the LOFs of the initial leads. Processor 44 updates the CKG as needed to reflect the results of the full acquisitions.

Processor 44 now selects a "best" profile from among the potential leads, at a best profile selection step 98. Various heuristics and criteria can be used for this purpose. Several example heuristics are given and explained further below.

Processor 44 then checks whether the selected best profile is connected to the target profile, i.e., whether the selected potential lead is indeed a lead, at a lead checking step 102. The processor performs a focused query on the selected best profile for this purpose.

If the selected best profile is found to be a lead, processor 44 adds it to the list of known leads, i.e., to the reconstructed LOF of the target profile, at a lead adding step 106. Processor 44 then performs full acquisition on the selected best profile in order to obtain its LOF, at a full acquisition step 110. If necessary, processor 44 updates the CKG with the results of the full acquisition, at a CKG updating step 114.

Processor 44 checks whether the applicable termination condition is met, at a termination checking step 118. For example, the processor may check if the permitted number of focused queries and full acquisitions is reached. If the termination condition is met, processor 44 outputs the reconstructed LOF of the target user, at an output step 122, and the method terminates. Otherwise, the method loops back to step 98 above for selecting the next best profile for evaluation.

If, at step 102, processor 44 finds that the selected best profile is not a lead, steps 106-114 are skipped, and the method moves directly to termination checking step 118.

The search strategy and flow of FIG. 3 are chosen purely by way of example. In alternative embodiments, any other suitable search process, heuristics and criteria can be used.

Example Heuristics for Selecting The "Best" Profile in the Best-First Search As noted above, the criteria of heuristic used by processor 44 in selecting the "best" potential lead for evaluation (step 98) has a significant impact on the search performance. In various embodiments, processor 44 may select the best potential lead using different criteria or heuristics.

In one embodiment, processor 44 chooses the best profile at random from among the profiles that are present in the OPEN queue. In another embodiment, processor 44 manages the OPEN queue as a First-In First-Out (FIFO) queue, i.e., orders the profiles in accordance with the order in which they were added to the OPEN queue. In this embodiment, processor 44 selects for evaluation the oldest profile in the OPEN queue that was not yet selected.

Other example selection heuristics are referred to as homophily-based heuristics. These heuristics are based on the assumption that users are more likely to be connected to users who share similar attributes, such as ethnic affiliation, education level, profession or other attributes. Following this assumption, potential leads that have similar attribute values to the target profile are more likely to be genuine leads.

Thus, in some embodiments processor 44 retrieves the various attribute values of the potential leads in the OPEN queue. The processor assigns each potential lead a respective homophily score, which quantifies the similarity in selected attribute values between the potential lead and the profile of the target user. The processor chooses the potential lead having the highest homophily score as the best profile for evaluation. In an example embodiment, when analyzing a given profile, the processor assigns a respective similarity score for each attribute, and sums the similarity scores to produce the homophily score of the profile.

Yet another example heuristic is referred to as a promising heuristic. This heuristic is based on the assumption that a profile, which is connected to a lead that was found to be connected to many other leads, is more likely to be a lead than a profile that is connected to a lead that is connected to only few leads. In other words, this heuristic gives precedence to profiles that have better promise to lead to future, undiscovered leads.

Processor 44 may define and evaluate various heuristics based on this principle. In an example embodiment, processor 44 maintains for every lead L two counters referred to as a "promise counter" and an "upsetting counter." The promise counter (denoted p) counts the number of contacts of L that are known to be leads. The upsetting counter (denoted u) counts the number of contacts of L that are known not to be leads. Processor 44 calculates for every lead L a "promise factor" P(L) that is given by P(L)=p/(p+u) if p+u>0, and P(L)=0.5 otherwise. The score of each potential lead n is an aggregation over the known leads to which this potential lead is connected. The aggregation is given by $$Score(n) = 1 - \prod_{m \text{ neighbor of } n} (1 - P(m))$$

and the potential lead having the highest score is selected as the best profile for evaluation.

Both the homophily heuristic and the promising heuristic described above are highly effective in some scenarios and less effective in other scenarios. In some embodiments, processor 44 combines the two heuristics using a machine learning process.

Each of the two heuristics is defined as a function that assigns respective scores to profiles, such that the profile (potential lead) having the highest score is selected as the best profile. In some embodiments, processor 44 uses the scores of the heuristics as features for a classifier, which classifies whether (and to what extent) a profile having these scores is expected to be a lead. Typically, processor 44 uses a classifier that outputs a soft confidence level (a certainty that the classification is correct) rather than a binary decision. Processor 44 uses this confidence level as a scoring function for profiles. In other words, processor 44 selects the profile having the best confidence level of being a lead, as output by the classifier, as the best profile for evaluation.

In an example embodiment, processor 44 trains the classifier using on-line learning. In this embodiment, the on-line learning scheme uses two parameters—A default heuristic h and a cold-start number C. The first C profiles (potential leads) are selected for evaluation using the default heuristic h. Since focused querying is applied to these C profiles, it is known which of them are leads and which are not. As such, the first C profiles can be used as a training set for training a classifier. Processor 44 performs this training before selecting the $(C+1)^{th}$ profile.

In a subsequent iteration of the best-first search, before choosing the best potential lead for evaluation, a new classifier is learnt using all the previously evaluated potential leads as the training set. The resulting classifier is then used for choosing the next potential lead for evaluation. In some embodiments, it is possible to reduce computational complexity by learning a new classifier every K iterations, where K is a parameter. The performance of the on-line learning scheme typically depends on the default heuristic h, on C and possibly on K.

In an alternative embodiment, processor 44 trains the classifier using off-line learning. In this embodiment, the assumption is that processor 44 has access to information gathered during M previous solution instances, i.e., M previous sessions of finding the LOFs of target users. Every such instance has a target profile and a set of initial leads. The assumption is that, for every such instance, processor 44 has access to the potential leads that were chosen for evaluation during the previous runs, including information as to which of these potential leads indeed was a genuine lead. Processor 44 uses the information for the previous runs as a training set for training a classifier. The resulting classifier is then used for choosing the next potential lead for evaluation.

In an embodiment, the off-line learning scheme can be combined the on-line learning scheme, for example by using the off-line-learned heuristic as the default heuristic in the on-line scheme, and using the newly acquired profiles with the off-line training set to produce a larger training set.

When using the machine learning schemes described above, the classifier may be biased by the fact that the training set contains a considerably larger number of profiles that are not leads than profiles that are leads. In some embodiments, processor 44 uses under-sampling or over-sampling methods in order to balance the training set and avoid such a bias.

Various balancing techniques are known in the art, and any suitable method can be used by processor 44. One example is the SMOTE algorithm, which is described, for example, by Chawla et al., in "SMOTE: Synthetic Minority Over-sampling Technique," Journal of Artificial Intelligence Research, volume 16 (2002), pages 321-357, which is incorporated herein by reference.

In the examples above, the features of a profile (used for classifier training) are the scores given to the profile by a set of heuristics. In alternative embodiments, it is possible to use the attribute similarity score described above as a feature of the profiles.

Although the embodiments described herein mainly address reconstruction of LOF of a target profile, the principles of the present disclosure can also be used for finding other sorts of acquaintances of a target person or members of a terrorist organization.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for determining friends of a target user on a social network, the method comprising:
   determining a friend of the target user;
   obtaining, from the determined friend's profile, a list of friends (LOF);
   calculating a probability for each friend in the LOF, wherein each probability corresponds to the likelihood that each friend in the LOF is also a friend of the target user;
   selecting a lead from the LOF that has the highest probability;
   determining, from the lead's profile, that the lead is a friend of the target user; and
   repeating the obtaining, calculating, selecting, and determining with the lead as the determined friend.

2. The method according to claim 1, wherein the determining, from the lead's profile, that the lead is a friend of the target user comprises:
   querying the lead's list of friends for the target user and finding the target user.

3. The method according to claim 1, wherein the probability is based on one or more heuristics.

4. The method according to claim 3, wherein the one or more heuristics comprises a similarity in attribute values between the profile of the target user and each friend in the LOF.

5. The method according to claim 3, wherein the one or more heuristics comprises the number of other contacts of the target user that each friend in the LOF is connected to.

6. The method according to claim 1, wherein the repeating terminates after a particular number of iterations.

7. The method according to claim 6, wherein the particular number of iterations is below value that triggers the social network to utilize throttling and anti-scraping schemes.

8. The method according to claim 1, further comprising:
   adding the lead determined as a friend of the target user to a reconstructed list of friends for the target user.

9. The method according to claim 1, further comprising:
   updating, using the LOF, a currently-known graph (CKG) describing the relationships of profiles in the social network.

10. The method according to claim 1, further comprising:
    determining, from the lead's profile, that the lead is not a friend of the target user;
    selecting a lead from the LOF that has the next highest probability or terminating the repeating based on the next highest probability.

11. A system for determining friends of a target user on a social network, the system comprising:
    an interface, communicating with one or more social networks; and
    a processor communicatively coupled to the interface and executing computer-readable instructions that cause the processor to:
    determine a friend of the target user;
    obtain, from the determined friend's profile, a list of friends (LOF);
    calculate a probability for each friend in the LOF, wherein each probability corresponds to the likelihood that each friend in the LOF is also a friend of the target user;
    select a lead from the LOF that has the highest probability;
    determine, from the lead's profile, that the lead is a friend of the target user; and
    repeat the obtaining, calculating, selecting, and determining with the lead as the determined friend.

12. The system according to claim 11, wherein to determine, from the lead's profile, that the lead is a friend of the target user comprises:
    querying the lead's list of friends for the target user and finding the target user.

13. The system according to claim 11, wherein the probability is based on one or more heuristics.

14. The system according to claim 13, wherein the one or more heuristics comprises a similarity in attribute values between the profile of the target user and each friend in the LOF.

15. The system according to claim 13, wherein the one or more heuristics comprises the number of other contacts of the target user that each friend in the LOF is connected to.

16. The system according to claim 11, wherein the repeating terminates after a particular number of iterations.

17. The system according to claim 16, wherein the particular number of iterations is below value that triggers the social network to utilize throttling and anti-scraping schemes.

18. The system according to claim 11, wherein the processor is further caused to:
    add the lead determined as a friend of the target user to a reconstructed list of friends for the target user.

19. The system according to claim 11, wherein the processor is further caused to:
    update, using the LOF, a currently-known graph (CKG) describing the relationships of profiles in the social network.

20. A non-transitory computer readable medium containing computer readable instructions that when executed by a processor of a computer, which is in communication with a social network, to perform a method for determining friends of a target user on the social network, the method comprising:

determining a friend of the target user;

obtaining, from the determined friend's profile, a list of friends (LOF);

calculating a probability for each friend in the LOF, wherein each probability corresponds to the likelihood that each friend in the LOF is also a friend of the target user;

selecting a lead from the LOF that has the highest probability;

determining, from the lead's profile, that the lead is a friend of the target user; and repeating the obtaining, calculating, selecting, and determining with the lead as the determined friend.

* * * * *